US012244982B2

(12) United States Patent
Hering et al.

(10) Patent No.: US 12,244,982 B2
(45) Date of Patent: *Mar. 4, 2025

(54) MAPPING PORTS IN A PASSIVE OPTICAL NETWORK

(71) Applicant: VIAVI SOLUTIONS INC., Chandler, AZ (US)

(72) Inventors: David Hering, Martinsville, IN (US); Karl Oberlin, Indianapolis, IN (US); Koji Okamoto, Zionsville, IN (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/817,808

(22) Filed: Aug. 5, 2022

(65) Prior Publication Data

US 2024/0048875 A1 Feb. 8, 2024

(51) Int. Cl.
*H04Q 11/00* (2006.01)
*H04B 10/079* (2013.01)
*H04L 49/356* (2022.01)

(52) U.S. Cl.
CPC ..... *H04Q 11/0062* (2013.01); *H04B 10/0791* (2013.01); *H04B 10/0795* (2013.01); *H04L 49/357* (2013.01); *H04Q 2011/0083* (2013.01)

(58) Field of Classification Search
CPC .......... H04Q 11/0062; H04Q 11/0067; H04Q 2011/0083; H04Q 2011/0084; H04Q 2011/0088; H04Q 2011/0081; H04B 10/0791; H04B 10/0795; H04B 10/272; H04B 10/0775; H04B 10/07955; H04B 10/25; H04B 10/564; H04L 49/357; G01M 11/088; G01M 11/30; G01M 11/03
See application file for complete search history.

(56) References Cited

U.S. PATENT DOCUMENTS

| | | | | |
|---|---|---|---|---|
| 2002/0087908 | A1* | 7/2002 | Dossey | G06F 1/28 713/340 |
| 2005/0041902 | A1* | 2/2005 | Frigo | G02B 6/447 385/1 |
| 2005/0276537 | A1* | 12/2005 | Frisken | G02B 6/2713 385/24 |
| 2006/0153517 | A1* | 7/2006 | Reagan | G02B 6/3897 385/135 |
| 2019/0212761 | A1* | 7/2019 | Swanson | A61B 5/0075 |
| 2020/0311365 | A1* | 10/2020 | Cottrill | G06K 19/06084 |
| 2022/0166502 | A1 | 5/2022 | Hirota et al. | |

* cited by examiner

*Primary Examiner* — Hibret A Woldekidan
(74) *Attorney, Agent, or Firm* — DLA Piper LLP (US)

(57) ABSTRACT

Mapping of ports to other network components is generated by physically bending a fiber optic cable and then determining which optical network terminals experience a signal power loss (or receive attenuated signals) based on the bending. The physical bending can be done using a bending tool and the optical network terminals that experience the signal power loss can be identified using a back-end database operation. Generally, the correspondence between the physical bending and the power loss at the downstream components and or upstream components of the network is used to create the mapping of the ports at the splitter level.

18 Claims, 6 Drawing Sheets ns and upstream data from the household premises to the headend. In some instances, the fiber optic cables may be bundled, with the fiber optic bundles providing a communication link between two points. In other instances, a single fiber optic cable may provide a communication link between two points.

MAPPING PORTS IN A PASSIVE OPTICAL NETWORK

BACKGROUND

Network systems may generally use passive optical networks for data transmission. A passive optical network (PON) comprises a plurality of fiber optic cables that carry downstream data from a central office (e.g., of a high speed data network, telephony network, etc.) to household premises and upstream data from the household premises to the headend. In some instances, the fiber optic cables may be bundled, with the fiber optic bundles providing a communication link between two points. In other instances, a single fiber optic cable may provide a communication link between two points.

At different points in a passive optical network, splitters are used to divide and distribute signals. As an example, in a street splitter cabinet, an input port receives a fiber optic cable and or a fiber optic bundle from upstream components. Within the splitter cabinet, multiple splitters then split the signals received at the input port and distribute the split signals to multiple output ports. The output ports may be connected to household premises. The complexity of splitting may exponentially increase as the aforementioned input port can receive signals from upstream splitters and one or more output ports can provide signals to downstream splitters (as opposed to household premises) to create a cascade of splitters. Due to these splits and re-splits, the complexity of the network increases very quickly.

For passive optical networks, network mapping technology that maps connections between components of the network has not kept pace with this increasing network complexity. For example, components within passive optical networks are provided with excess capacity to accommodate increases in future demand. Furthermore, there may be disconnections and reconnections as households change preferences or ownership. Problems may stem from the aforementioned street splitter cabinet, which is generally installed with more output ports than needed at the time of installation. Technicians may randomly select a subset of output ports for connecting the existing household premises. If a household discontinues its service, the connection at the box may not necessarily be disconnected—the connection may exist and be powered, but has an inactive status. When a new service is to be established, a technician may use an unused port without realizing that other ports are inactive and could have been used. In another scenario, if all output ports are being used—in which some of them may be inactive—and a new connection is to be made, the technician may not necessarily know which port is inactive and therefore fit to be disconnected and used for the new connection. The technician may unknowingly disconnect an active port connected to another household premise and make the new connection to this port, causing this household premise to lose its connection. Generally speaking, the technician works under an expedience structure: there is a narrow time window to achieve a particular task of creating the new connection. The technician may not consider—and does not have the tools to consider—the status of other connections. This piecemeal, disjointed problem solving does not record and generate a mapping knowledge. Consequently, troubleshooting even at the street splitter cabinet tends to be extremely difficult. When this lack of local mapping knowledge is combined with lack of mapping knowledge at other splitters and components, the troubleshooting complexity increases exponentially.

A conventional approach is physically disconnecting ports to determine which downstream components lose power and generate a mapping based on this determination. But this approach creates service disruptions by taking customers out of service. Another approach is to use test instruments that can identify the household premise connected to a port. The setup for this test also requires disconnecting the customers and therefore causes service disruptions.

As such, a significant improvement in mapping technology in passive optical networks is therefore desired.

SUMMARY

Embodiments disclosed herein solve the aforementioned and other technical problems and may provide other solutions as well. In one or more embodiments, mapping of ports to other network components is generated by physically bending a fiber optic cable and then determining which optical network terminals experience a signal power loss (or receive attenuated signal) based on the bending. The physical bending can be done using a bending tool and the optical network terminals that experience the signal power loss can be identified using a back-end database operation. Generally, the correspondence between the physical bending to cause the signal attenuation at different points in the network and the power loss at the downstream and or upstream components of the network is used to create the mapping of the ports at the splitter level.

In an embodiment, a method of mapping ports in a passive optical network is provided. The method includes bending an optical fiber at a port of a passive component of the passive optical network to cause signal leakage at the bent portion of the optical fiber. The method also includes receiving indications of power losses at downstream and or upstream components caused by the signal leakage. The method further includes mapping at least one downstream component to the port based on the received indications of the power losses.

In another embodiment, a system of mapping ports in a passive optical network is provided. The systems includes a non-transitory storage medium storing computer program instructions and at least one processor configured to execute the computer program instructions to cause operations. The operations include bending an optical fiber at a port of a passive component of the passive optical network to cause signal leakage at the bent portion of the optical fiber. The operations also include receiving indications of power losses at downstream and or upstream components caused by the signal leakage. The operations further include mapping at least one downstream component to the port based on the received indications of the power losses.

DETAILED DESCRIPTION OF SEVERAL EMBODIMENTS

Passive optical networks include numerous components, such as splitters, organized at different layers of a hierarchy. These networks are generally built with excess capacity, e.g., built to cover all household premises slated to be built, to be gradually utilized over time. When old connections are to be removed, they may just be deactivated without necessarily removing the physical connection. Furthermore, when new connections are made, a check is not done to determine whether there is a port with an inactive connection that can be reused. Therefore, over the course of time, the connections become complicated—due to e.g., the connections, deactivations and reconnections—without a record of the mapping between different components. As the knowledge of these connections and the overall topology is sparse, troubleshooting becomes increasingly difficult. Furthermore, existing active connections may inadvertently be disconnected when making a new connection and service may be unnecessarily interrupted.

The example embodiments solve at least these technical problems by detecting power loss at downstream and or upstream components when e.g., an optical fiber is bent. The bending "bleeds" the signal (i.e., light) away from the fiber path thereby causing the signal to attenuate in the fiber path. Consequently, the downstream optical network terminals (ONTs) that are served by the optical fiber will experience the power loss. Additionally, upstream optical line terminals (OLTs) will experience power loss in the upstream signals. A connection relationship is made between the fiber that is bent, splitter ports, OLT ports, and the ONTs connected to the splitter ports and the ONT ports. When such collection relationships are aggregated, a knowledge base of the mapping of these components is generated. Furthermore, the mapping may be physically indicated in the ports as well, for example, by the use of tags in the splitter ports.

In case of connected but inactive ONTs, the ONT's report their own operational statuses may be used for the mapping. If an ONT is powered, connected to the PON network and does not have services from the PON Controller (AMS), it will report a "dormant" status. All dormant ONT's can be queried by the parent OLT. These queries can be used for the mappings between OLT ports and the ONTs. Furthermore, the connected but inactive ONTs may report back a power loss (e.g., due to bending of the fiber optic cable) to the corresponding OLTs. Therefore, the embodiments describing data from the active ONTs (e.g., data indicating power loss) also apply to the inactive but connected ONTs.

Figure 1A:
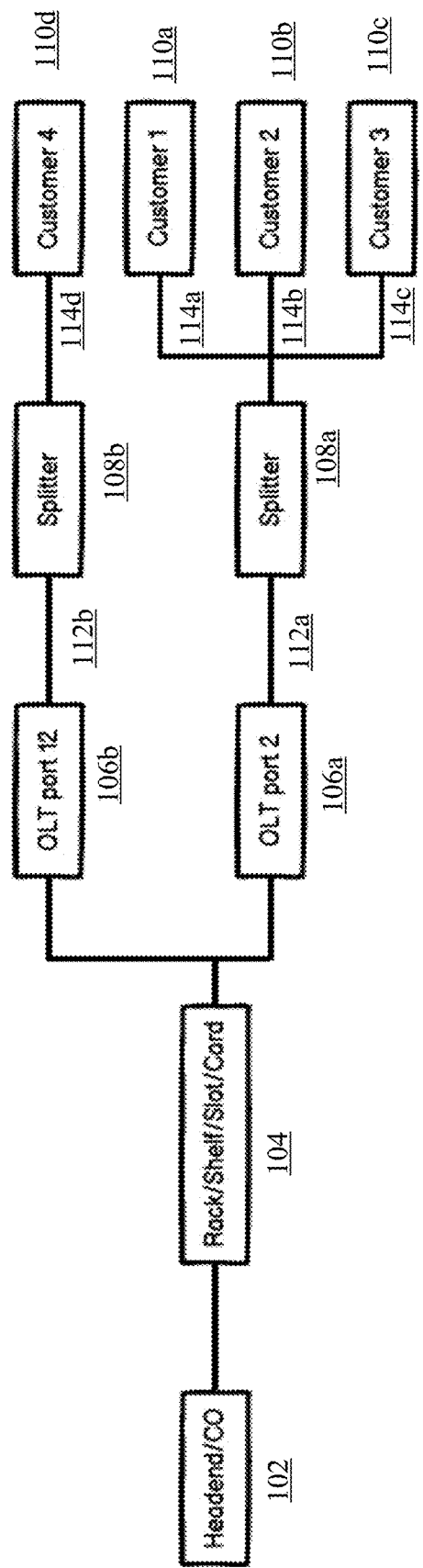
FIG. 1A shows an example view of a passive optical network, based on the principles disclosed herein.

FIG. 1A shows an example view of a passive optical network 100a, based on the principles disclosed herein. As shown, the passive optical network 100a comprises a headend/central office (CO) 102; headend components such as a rack, shelf, slot, and or card (collectively referred to as rack/shelf/slot/card 104); a plurality of OLT ports 106a, 106b); a plurality of splitters 108a, 108b); and a plurality of customers/household premises 110a-110d. It should be, however, understood that these components are just examples and should not be considered limiting. Passive optical networks with additional, alternative, or fewer number of components should also be considered within the scope of this disclosure.

The headend/CO 102 may generally include active electronic components that generate the signals that travel through the passive optical network 100a. In the context of a high speed data network, the headend/CO 102 is configured to serve the household premises 110a-110d by receiving content (e.g., high speed Internet) from upstream components, processing the content (e.g., amplifying the signal), and transmitting the content downstream. The headend/CO 102 may also receive upstream signals, e.g., from components at the household premises 110a-110d. The high speed data network here is just used as an example and should not be considered limiting. Any kind of network for video, data, and or telephony should be considered within the scope of this disclosure.

The rack/shelf/slot/card 104 comprises several components at the headend/CO 102 for connecting to the downstream components of the passive optical network 100a. For example, the rack/shelf/slot/card 104 provides OLT ports 106a, 106b for connecting to corresponding fiber optic bundles (or fiber optic cables) 112a, 112b, which in turn are connected to corresponding splitters 108a, 108b. In some embodiments, the splitters 108a, 108b are within street splitter cabinets, which service the individual premises 110a-110d through corresponding fiber optic cables 114a-114d.

Although the connections 114a-114d are shown between splitters 108a, 108b and household premises 110a-110d, it should be understood that the splitters may be arranged in cascading fashion. That is, a downstream connection of a splitter may be another splitter. Generally, any configuration of splitters and the household premises should be considered within the scope of this disclosure.

Figure 1B:
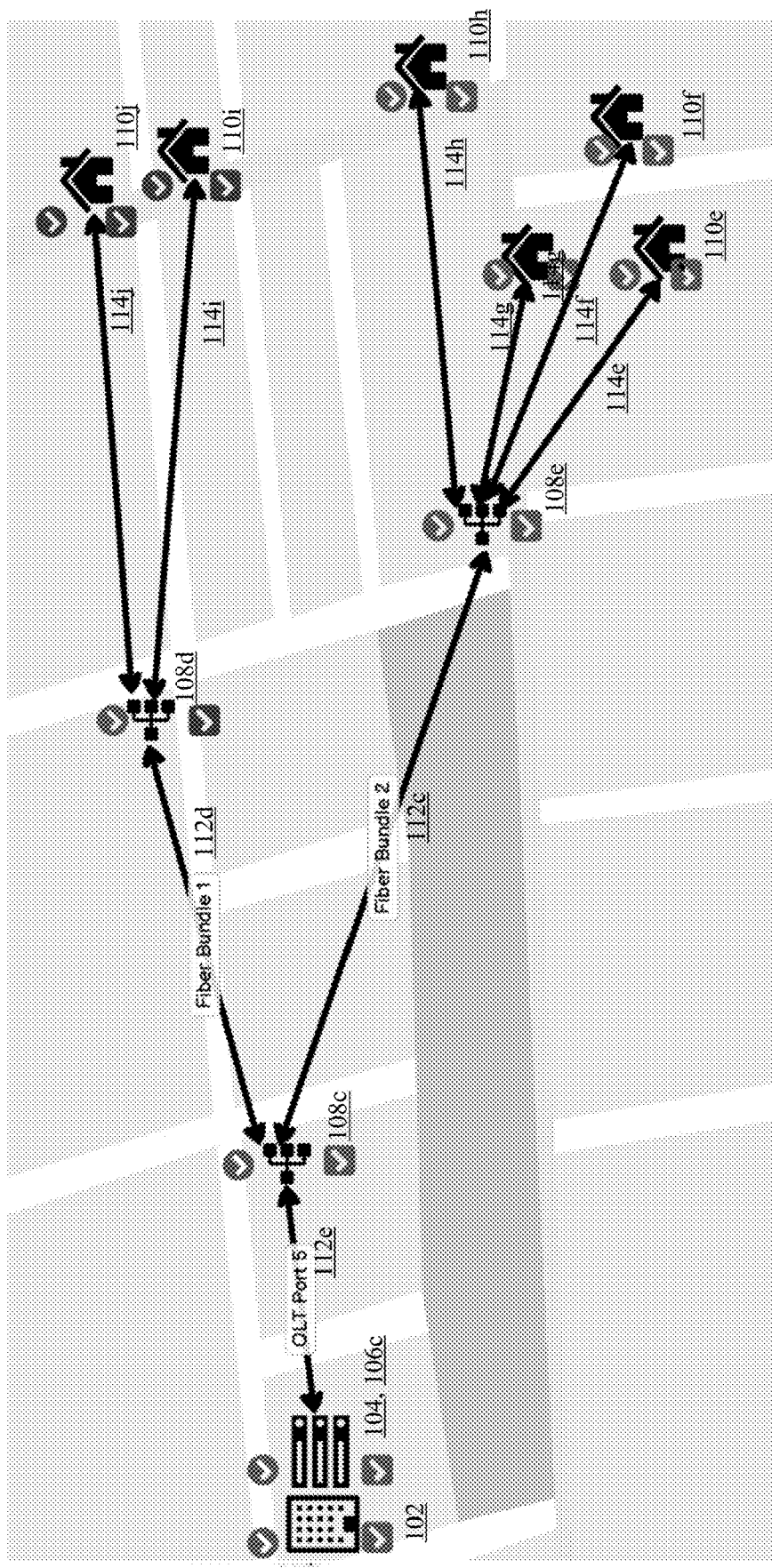
FIG. 1B shows an example view of another passive optical network, based on the principles disclosed herein.

FIG. 1B shows an example view of another passive optical network 100b, based on the principles disclosed herein. As shown, the passive optical network 100b comprises a headend/central office (CO) 102; headend components such as rack, shelf, slot, and or card (collectively referred to as rack/shelf/slot/card 104); a plurality of OLT ports (although on one port 106c is illustrated); a plurality of splitters 108c-108e; and a plurality of customers/household premises 110e-110j. It should be, however, understood that these components are just examples and should not be considered limiting. Passive optical networks with additional, alternative, or fewer number of components should also be considered within the scope of this disclosure.

As with the passive optical network 110a, the headend/CO 102 of the passive optical network 100b may generally include active electronic components that generate the signals to travel through the passive optical network 100b. In the context of a cable television network, the headend/CO 102 is configured to serve the household premises 110e-110j by receiving content (e.g., high speed Internet) from upstream components, processing the content (e.g., amplifying the received signal), and transmitting the content downstream. The headend/CO 102 may also receive upstream signals, e.g., from components at the household premises 110e-110j.

The rack/shelf/slot/card 104 comprises several components at the headend/CO 102 for connecting to the downstream components of the passive optical network 100b. For example, the rack/shelf/slot/card provides an OLT ports 106c (not to be conflated with splitter ports) for connecting to corresponding fiber optic bundle (or fiber optic cable) 112e, which in turn is connected to a splitter 108c. The splitter 108c is connected to downstream splitters 108d, 108e. In some embodiments, the downstream splitters 108d, 108e are within street splitter cabinets, which service the individual premises 110e-110j through the corresponding fiber optic cables 114e-114j.

Therefore, as shown the splitters 108 can be configured to directly service the household premises 110 or to service other downstream splitters 108. When connections are created, deactivated, and recreated at the splitters 108, the mapping information changes and may not be recorded. This lack of recordation causes a loss of crucial knowledge in network topology thereby causing inadvertent disruptions when new connections are attempted, and also makes troubleshooting extremely difficult. Embodiments disclosed herein mitigate at least these problems.

Figure 2:
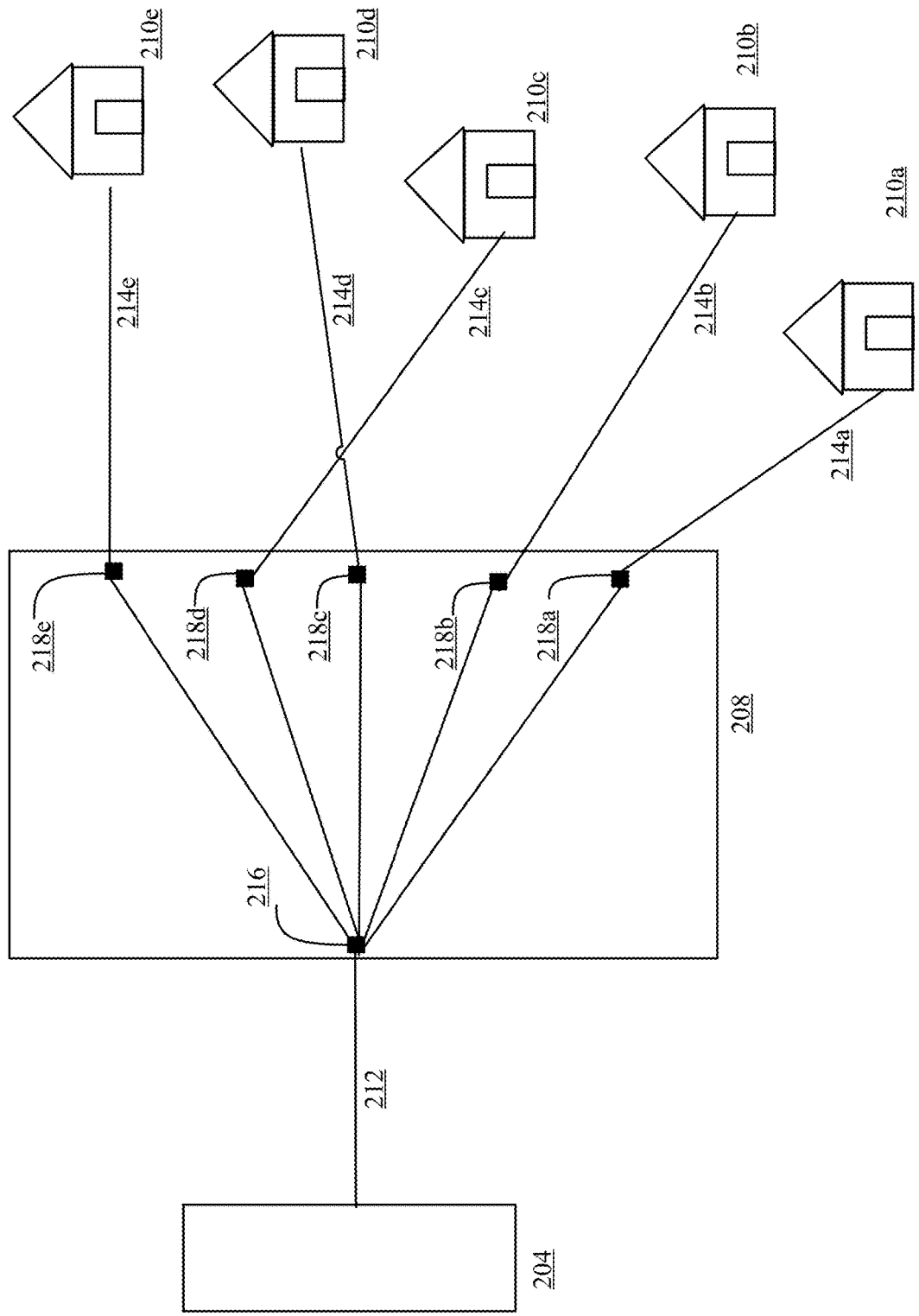
FIG. 2 shows an example portion of a passive optical network, based on the principles disclosed herein.

FIG. 2 shows an example portion of a passive optical network 200, based on the principles disclosed herein. The shown portion comprises a splitter 208, which is similar to the splitters 108a-108e shown in FIGS. 1A-1B. The splitter 208 is connected to an upstream component 204 (e.g., a port at a headend) through an optical fiber bundle 212 (or a single optical fiber). The optical fiber bundle 212 is connected to the splitter 208 at an input port 216. The signals received at the input port 216 are split by the splitter 208 and provided as outputs on output ports 218a-218e (collectively referred to as output ports 218 and commonly referred to as an output port 218). At the output ports 218a-218e, connections 214a-214e (collectively referred to as connections 214 and commonly referred to as a connection 214) are made such that household premises 210a-210e (collectively referred to as household premises 210 and commonly referred to as a household premise 210) receive communications from the upstream component 204 through the splitter 208. It should be understood that the input port 216 and output ports 218 described herein are splitter ports and should not be conflated with OLT ports at a central office.

As discussed above, the splitter 208 may be provided with excess connectivity. For example, during an initial installation, the number of output ports 218 may generally be greater than the number of desired connections 214. That is, excess connectivity is provided in anticipation of an increased demand, e.g., an increase in the number of household premises 210. Therefore, at the beginning, not all of the output ports 218 may be connected. Connections 214 are added as the number of household premises 210 increases. When a household premise 210 disconnects, the corresponding connection 214 may be kept and not disconnected. For example, the physical connection 214 exists and is powered, but its status inactive. After several different changes, all the ports 218 may be occupied with a hodge-podge of active and inactive connections, and the technician arriving at the splitter 208 to make a new connection does not have a way of knowing which output port 218 can be freed for the new connection. Embodiments disclosed herein provide a solution to create a mapping between the upstream component 204, input port 216, output ports 218, and ONTs in the household premises 210.

Figure 3:
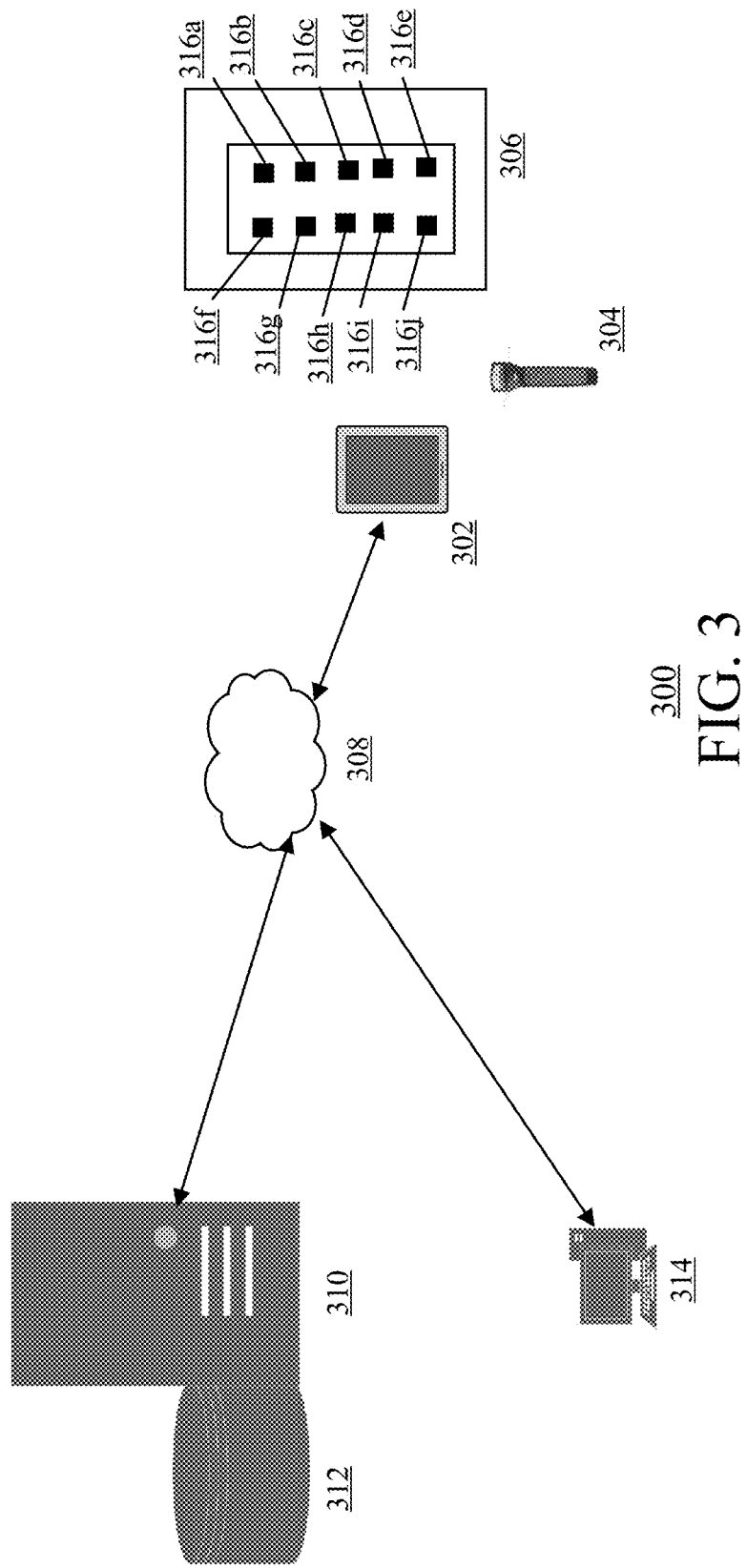
FIG. 3 shows an example network environment configured to implement the principles disclosed herein.

FIG. 3 shows an example network environment 300 configured to implement the principles disclosed herein. As shown, the network environment 300 comprises a mobile computing device 302 carried by a technician, a fiber optic bending device 304, as splitter cabinet 306, a network 308, a server computing device 310, a database 312, and an admin computing device 314. The shown network environment 300 is just an example, and any other type of network environments with additional, alternative, or fewer number of components should be considered within the scope of this disclosure.

The mobile computing device 302 may be any type of computing device carried by a technician when connections at the splitter cabinet 306 are to be modified. For example, the technician may carry the mobile computing device 302 to add a new connection to the splitter cabinet 306, troubleshoot existing connections in the splitter cabinet 306, and or any other operations associated with the splitter cabinet 306. The mobile computing device 302 may comprise any kind of computing device such as a mobile phone, a tablet computer, a laptop computer, and or the like. Structurally, the mobile computing device 302 comprises a memory to store computer program instructions, a processor to execute the computer program instructions, a display to provide information to the technician, communication components to communicate through the network 308, and the like. Functionally, the mobile computing device 302 may provide a graphical user interface on the display for the technician to retrieve and enter data associated with the passive optical network. In some embodiments, the mobile computing device 302 may provide latitude and longitude coordinates to the server 310 such that the mobile computing device 302 may be located. The interface between the mobile computing device 302 and the technician and the other mobile functionality discussed herein may be provided through a mobile computing device 302 application (e.g., a smartphone app). In one or more embodiments, the mobile computing device application may include XPERTrak™ by Viavi Solutions®.

The fiber optic bending device 304 may comprise any kind of mechanical or electromechanical device that may be used to bend a fiber optic cable (and or a fiber optic cable bundle) 316a-316j. In some embodiments, the fiber optic bending device 304 may provide a fixed mechanical structure (e.g., groove within its housing) that is used to create a predetermined bend. In other embodiments, the fiber optic bending device 304 may be actuated (e.g., either manually or through an electromechanical actuation) to control the level of the bend. The fiber optic bending device 304 may also include a display to show the attributes, e.g., the angle of the bend, associated with the bending operation. Therefore, simple devices and devices with instrumentation and measurement capabilities are to be considered within the scope of this disclosure. Regardless of the type of the fiber optic bending device 304 and the functionality it provides, the bending operation generally creates an optical leak. The optical leak causes downstream and upstream signals to attenuate, i.e., to lose some of the power. That is, the leaked signal (i.e., light) bleeds into the environment and therefore cannot continue downstream and upstream through the bent optical fiber.

The splitter cabinet 306 may be any kind of splitter cabinet. For example, the splitter cabinet 306 may include a street level splitter cabinet providing a direct connection to household premises or to other splitter cabinets. In other examples, the splitter cabinet 306 may not necessarily provide a direct connection to the household premises, but provide connections to other downstream splitter cabinets, which in turn may provide connections to the household premises and or other splitter cabinets. The splitter cabinets 306 may comprise at least one input port to receive signals from upstream components and multiple output ports to transmit the received signals to corresponding multiple downstream components (again, these splitter ports are not to be conflated with OLT ports at a central office). Therefore, a knowledge of mapping of the ports, particularly the multiple output ports to the multiple corresponding downstream and upstream components, is desired.

The network 308 (not to be conflated with the passive optical networks 100a, 100b shown in FIGS. 1A-1B) may be any kind of network that facilitates the communications between different components of the network environment 300. For example, the network 308 may operate through packet switching protocols (e.g., IP), circuit switching protocols (e.g., cellular telephony), or a combination of both. The network 308 may comprise wired links, wireless links (e.g., 5G LTE), satellite links, and or any other types of links. Some non-limiting examples of the network 308 include local area network (LAN), metropolitan area network (MAN), and Wide Area Network (WAN) such as the Internet.

The server computing device 310 may comprise any kind of computing device configured to provide server functionality in the network environment 300. Although the server computing device 310 is shown as a single entity for illustration, the server computing device 310 may include a combination of a plurality of computing devices at the same geographical location or at geographically distributed locations. Some non-limiting examples of the server computing device 310 may include desktop computers, laptop computers, and the like. In some embodiments, the database 312 may be hosted by the server computing device 310. In other embodiments, the database 312 may be connected to the server computing device 310. The database 312 may comprise any kind of database such as object-oriented database, relational database, and or the like. The data in the database may be sourced from other server computing devices and or other databases.

The admin computing device 314 is generally used for coordination functionality for the mapping methods disclosed herein. To that end, the admin computing device 314 includes computing devices that are used to control and coordinate the technicians' visits to the site of the splitter cabinet 306. The admin computing device 314 may show the statuses of various connections, known mapping data between the different ports with varying degree of certainty, a queue of the jobs to be performed, and the like.

In operation, a fiber optic cable at the splitter cabinet 306 may be bent using the fiber optic bending device 304. Power loss (or signal attenuation) at downstream components (e.g., ONTs) and or upstream components (e.g., OLTs) may be retrieved from a tracking tool running on the mobile computing device 302 (e.g., as an application). Furthermore, the mobile computing device 302 may provide latitude longitude coordinates (e.g., through the application) for the network environment 300 to determine the location of the splitter cabinet 306. The tracking tool may poll the server 310 and or the database 312 to retrieve the signal attenuation data (e.g., signal attenuation data may be correlated with the location of a household premise).

Figure 4:
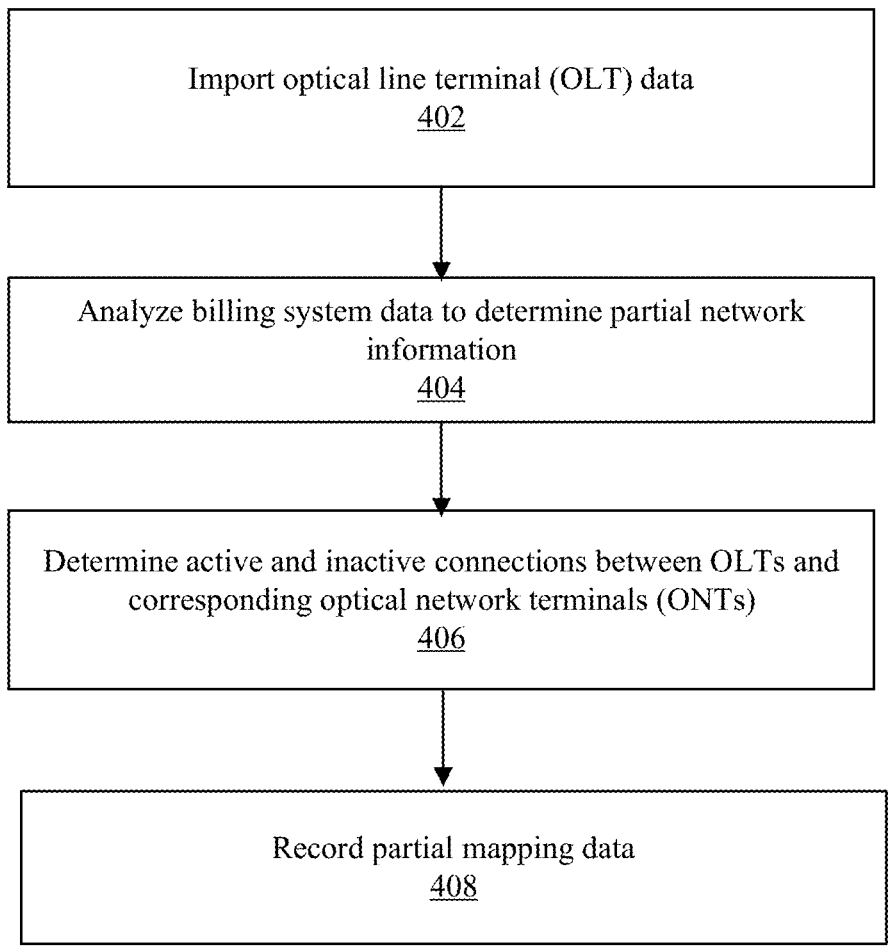
FIG. 4 shows a flow diagram for a setup method for port mapping, based on the principles disclosed herein.

FIG. 4 shows a flow diagram for a setup method 400 for port mapping, based on the principles disclosed herein. The steps of the method 400 may be performed by any combination of components of the network environment 300. Furthermore, the steps shown in FIG. 4 are merely examples; and methods with additional, alternate, or fewer number of steps are to be considered within the scope of this disclosure. Furthermore, the steps show example operations that are not be considered limiting. Also, the demarcation and the ordering of the steps is just for explanatory purposes and not to show a sequential operation.

At step 402, optical line terminal (OLT) data may be imported. For example, a connection (e.g., by server 310 shown in FIG. 3) may be made to a database of a network provider (e.g., a cable television network provider) and database records associated with a plurality of OLTs may be retrieved. The records may be stored in a database (e.g., database 312). The OLT data may include billing system data.

At step 404, the billing system data may be analyzed to determine partial network information. The billing system data may include the addresses (e.g., residential addresses) of optical network terminals (ONTs) served by the OLTs. The addresses therefore may be used to determine the geographical locations of the ONTs connected to the OLTs—without necessarily knowing the corresponding connection paths. Therefore, partial network information with OLTs-ONTs connection grouping may be determined. In other embodiments, the addresses may not necessarily be within the billing data. Instead, the billing data may contain some network topology information, but not necessarily the mapping data at the splitter level. This partial data also may be used to determine partial network information. It should, however, be understood that different types of data are merely examples and other types of data may also be used determine partial network information.

At step 406, active and inactive connections between OLTs and corresponding ONTs may be determined. This determination may also be based on OLT data. In other words, the OLT data may provide an indication of what ONTs are hooked up to each OLT port. The OLT data may also indicate which connections are active and which of those are inactive (still hooked up and powered on despite the cancellation of the service).

At step 408, partial mapping data may be recorded. The partial mapping data may be based on the information extracted in steps 404 and 406. The partial mapping data may be entered by an admin through an admin computer (e.g., admin computer 314 shown in FIG. 3).

The setup method 400 may therefore generate and record partial mapping information, which may then be used as a starting point to work toward more complete mapping information. The more complete mapping information may include splitter level connection data, e.g., mapping between an individual ports of splitters and the corresponding upstream and or downstream component(s).

Figure 5:
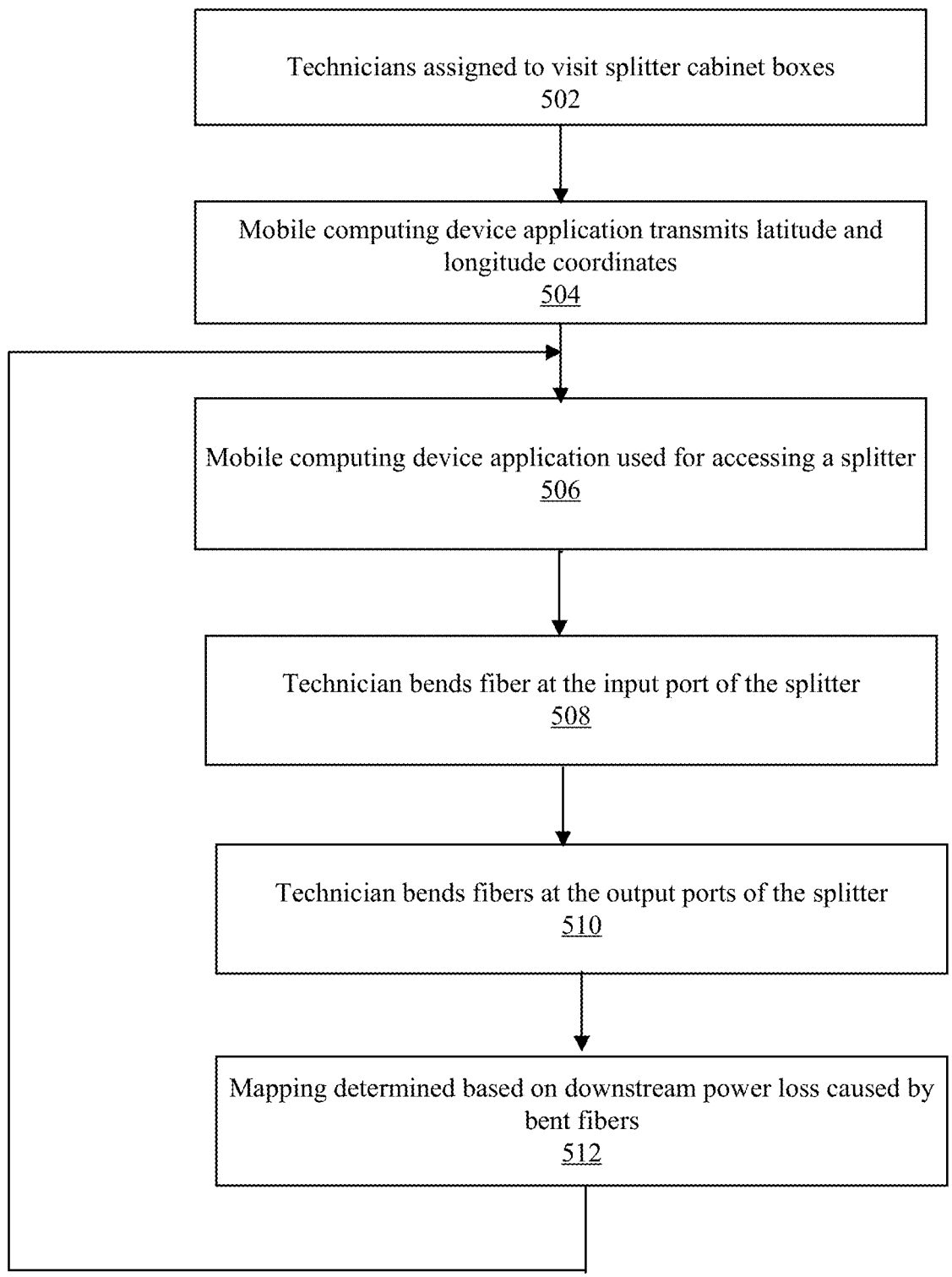
FIG. 5 shows a flow diagram of an example port mapping method, based on the principles disclosed herein.

FIG. 5 shows a flow diagram of an example port mapping method 500, based on the principles disclosed herein. The steps of the method 500 may be performed by any combination of components of the network environment 300. Furthermore, the steps shown in FIG. 5 are merely examples, and methods with additional, alternate, or fewer number of steps are to be considered within the scope of this disclosure. Furthermore, the steps show example operations that are not be considered limiting. Also, the demarcation and the ordering of the steps is just for explanatory purposes and not to show a sequential operation.

The method 500 may begin at step 502, where technicians are assigned to visit splitter cabinets. In some embodiments, the splitter cabinets may comprise street level splitter cabinets configured to connect to individual premises. In other embodiments, the splitter cabinets may connect to other splitter cabinets thereby generating a cascaded formation. The technicians may be assigned in an order of priority—with a higher priority to the splitter cabinets with maximum number of unmapped ports and splitter cabinets having relatively larger number of connections and with a lower priority to the splitter cabinets having relatively smaller number of connections.

When a technician arrives at an assigned splitter cabinet with a mobile computing device and opens an application on the mobile computing device, the mobile computing device application at step 504 transmits the latitude and longitude coordinates to a system back-end device (e.g., server 310 shown in FIG. 3). The coordinates allow for the establishing of the splitter cabinet's location, and if it was already established, allow a confirmation of the established location.

At step 506, the mobile computing device application may be used for accessing a splitter within the splitter cabinet. The mobile computing device application may render an interface, e.g., graphical and or a text interface, that allows the technician to select (or virtually "open") a splitter among a plurality of splitters in the splitter cabinet. The selection may allow the back-end device to determine which splitter is being accessed for testing its connections to other components to determine the mapping.

At step 508, the fiber at the input port of the selected splitter may be bent by the technician. The bending may be triggered by the mobile computing application generating a message to the technician that the bending may begin. The bending is done using a bending tool, which may be a simple mechanical device or an electronic device with measurement and instrumentation capabilities. In response to the bending, there may be a signal loss at all the downstream ONTs and upstream components (e.g., OLTs) connected to the selected splitter. The indication of the signal loss may be received at the back-end device and provided to the mobile computing device application.

At 510, the optical fibers at the output ports of the splitter may be bent by the technician. The bending may be triggered by the mobile computing application generating another message to the technician that the bending at the output ports may begin. The bending may be sequential where the technician bends the optical fiber one by one until all the optical fibers are bent. At each bending action, the mobile computing device application receives feedback of the signal losses at the downstream ONTs and upstream OLTs. For example, if the optical fiber of port 1 is bent and that causes a signal loss in a household premise; it may be determined that the household premises 1 is connected to port 1. Similarly, if the bend in the optical fiber of port 1 causes a signal loss at a port 1 (not to be conflated with splitter port where the fiber is being bent) of ONT 1, it may be determined that splitter port 1 is connected to ONT 1 through ONT port 1.

In one or more embodiments, safeguards may be provided to ensure that the bending does not create a signal disruption. Therefore, prior to sending the indications to perform the bending operation, the power levels may be checked to determine whether the levels have an adequate margin and will not be adversely affected by the bending. If the power levels are too low, an indication may be generated to the technician that bending may not be feasible at this time and should be tried again later.

At 512, mapping is determined based on the downstream and or upstream power loss caused by the bent fibers in steps 508 and 510. For example, a bent optical fiber at an input port of a splitter will cause all the ONTs connected downstream to the splitter to lose some signal power. Thus, based on the detected signal power, a mapping between the input port and the downstream components may be created. Furthermore, the bent optical fiber at the input port of the splitter will cause power loss at an upstream ONT port. This power loss can be used to create a mapping between the input port of the splitter and the upstream ONT port. A bent optical fiber at an output port of the splitter will cause the downstream and upstream components connected to the output port to lose some signal power. A mapping between the output port and the corresponding downstream and or upstream components may be created based on the detected signal power.

It should also be understood that the bending and the corresponding detection of signal power losses can be performed at any point in the passive optical network. For example, the bending and the signal power loss detection may be started at street splitter cabinets to determine the mapping between the ports (i.e., the splitter ports) in these cabinets and the household premises. The bending may be performed at other upstream components to generate another layer of mapping knowledge. The bending may continue upstream until an optimal amount of mapping knowledge about the network is generated.

Furthermore, at the admin level, a job tracker interface may also be provided as the method 500 is being implemented. The job tracker interface may indicate what percentage of each OLT port has been mapped down to the splitter level. The percentage may be based on the percentage of the home premises that have been mapped and or the percentage of the splitters that have been mapped. When an OLT has a predetermined percent of mapping (e.g., 100%, 95%, 90%, etc.), an indication may be generated that the mapping job has been completed.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of mapping ports in a passive optical network, the method comprising:
   bending, manually on a fixed groove within a housing of a non-instrument mechanical tool, an optical fiber at a port of a passive component of the passive optical network to cause signal leakage at a bent portion of the optical fiber;
   receiving indications of power losses at downstream and or upstream components caused by the signal leakage; and
   mapping at least one downstream component to the port based on the received indications of the power losses.

2. The method of claim 1, wherein the passive component comprises a splitter.

3. The method of claim 1, wherein the port comprises an input port.

4. The method of claim 3, wherein the at least one downstream component comprises at least one optical network terminal, and wherein the mapping further comprises:

mapping the input port to all of optical network terminals connected to output ports of the passive component.

5. The method of claim 1, wherein the port comprises an output port.

6. The method of claim 5, wherein the at least one downstream component comprises an optical network terminal, wherein the mapping further comprises:

mapping the output port to the optical network terminal.

7. The method of claim 1, further comprising:

geolocating the passive component based on latitude longitude coordinates measured by a mobile computing device.

8. The method of claim 1, wherein the indication of the power losses at the downstream and or the upstream components are received at a mobile computing device application.

9. The method of claim 1, further comprising:

tagging the port with the mapped at least one downstream component.

10. A system of mapping ports in a passive optical network, the system comprising:

a non-instrument mechanical tool comprising a housing with a fixed groove that is configured to be used to bend an optical fiber manually at a port of a passive component of the passive optical network to cause signal leakage at a bent portion of the optical fiber;

a non-transitory storage medium storing computer program instructions; and at least one processor configured to execute the computer program instructions to cause operations comprising:

receiving indications of power losses at downstream and or upstream components caused by the signal leakage; and mapping at least one downstream component to the port based on the received indications of the power losses.

11. The system of claim 10, wherein the passive component comprises a splitter.

12. The system of claim 10, wherein the port comprises an input port.

13. The system of claim 12, wherein the at least one downstream component comprises at least one optical network terminal, and wherein the mapping further comprises:

mapping the input port to all of optical network terminals connected to output ports of the passive component.

14. The system of claim 10, wherein the port comprises an output port.

15. The system of claim 14, wherein the at least one downstream component comprises an optical network terminal, wherein the mapping further comprises:

mapping the output port to the optical network terminal.

16. The system of claim 10, wherein the operations further comprise:

geolocating the passive component based on latitude longitude coordinates measured by a mobile computing device.

17. The system of claim 10, wherein the indication of the power losses at the downstream and or the upstream components are received at a mobile computing device application.

18. The system of claim 10, wherein the operations further comprise:

tagging the port with the mapped at least one downstream component.

* * * * *